United States Patent [19]
Kunz

[11] Patent Number: 6,029,779
[45] Date of Patent: Feb. 29, 2000

[54] AUTOMATIC PARKING BRAKE AND STEERING SPINDLE

[75] Inventor: John P. Kunz, Clovis, Calif.

[73] Assignee: UpRight, Inc., Selma, Calif.

[21] Appl. No.: 08/969,816

[22] Filed: Nov. 13, 1997

[51] Int. Cl.⁷ .................................................. B60B 33/00
[52] U.S. Cl. ..................... 188/1.12; 188/170; 16/35 R
[58] Field of Search .................................. 188/170, 1.12, 188/29; 16/35 R

[56] References Cited

U.S. PATENT DOCUMENTS

| | | |
|---|---|---|
| 2,388,692 | 11/1945 | House . |
| 2,638,183 | 5/1953 | Prowinsky . |
| 2,775,313 | 12/1956 | Kurvers et al. . |
| 3,085,285 | 4/1963 | Morlik . |
| 3,532,188 | 10/1970 | Kelz . |
| 3,848,692 | 11/1974 | Messner et al. . |
| 4,175,783 | 11/1979 | Ploth ........................................ 188/1.12 |
| 4,336,860 | 6/1982 | Noller et al. ............................. 180/273 |
| 4,679,645 | 7/1987 | Galloway et al. ....................... 188/1.12 |
| 4,998,320 | 3/1991 | Lange ...................................... 188/1.12 |
| 5,242,035 | 9/1993 | Lange ...................................... 188/1.12 |
| 5,394,959 | 3/1995 | Cullity et al. ............................ 187/244 |

*Primary Examiner*—Mark T. Le
*Assistant Examiner*—Robert A. Siconolfi
*Attorney, Agent, or Firm*—Bruce H. Johnsonbaugh

[57] ABSTRACT

A combination automatic parking brake and steering spindle is provided for use in a self-propelled vehicle carrying an elevatable boom or work platform. The automatic parking brake includes a brake cylinder which also acts as a steering spindle for the vehicle. The parking brake is actuated by a spring carried in the brake cylinder and urges a parking brake pad into contact with a steerable wheel. The parking brake is automatically released when the hydraulic propulsion system for the vehicle is activated and hydraulic pressure enters the brake cylinder compressing the spring and releasing the parking brake.

8 Claims, 7 Drawing Sheets

AUTOMATIC PARKING BRAKE AND STEERING SPINDLE

BACKGROUND AND BRIEF SUMMARY OF THE INVENTION

The present invention relates generally to a parking brake for use on a self-propelled vehicle. More particularly, the invention relates to a combination automatic parking brake and steering spindle for use in a self-propelled vehicle carrying a elevatable boom or work platform. The present invention utilizes a hollow cylindrical steering spindle as a cylinder for the automatic parking brake.

It is known in the prior art to provide a manually actuated parking brake through a steering yoke or spindle. Those devices are typically used on relatively small hand operated carts and hand operated fork lifts. The parking brake is typically activated by pulling a lever or rotating a threaded rod. Such prior art includes U.S. Pat. No. 2,638,183 which teaches a manual brake extending through a steering yoke and having a "dead man" feature. The user must depress the handle to release the brake and the handle must be kept in its depressed position to operate the dolly. U.S. Pat. No. 3,532,188 also teaches a manually operated brake extending through a steering yoke of a hand operated fork lift. Other similar manually activated brake mechanisms on small carts are shown in U.S. Pat. Nos. 2,775,313, 3,085,285 and U.S. Pat. No. 2,388,692.

The present invention provides an automatic parking brake using as its brake cylinder a tube or cylinder which also serves as a steering spindle for the vehicle. The vehicle is a self-propelled lift carrying an elevatable boom or work platform, typically weighing approximately 3,000 pounds, and capable of carrying up to a 750 pound load. The invention may be readily adapted for use on much heavier vehicles in the range of 12,000 to 15,000 pounds vehicle weight and a working load capacity of 1200 pounds and greater. Additionally, these vehicles are capable of operating on inclines as steep as a 30% incline with its boom or work platform at least partially elevated. These operating conditions and operating vehicle weights and loads require a heavy duty vehicle parking brake.

The parking brake of the present invention is normally engaged by a spring or springs carried in the combination brake cylinder and steering spindle. When the propulsion system for the vehicle is energized, hydraulic pressure enters the brake cylinder and compresses the spring or springs, thereby automatically releasing the parking brake. By utilizing a hollow steering spindle to also form the outer surface of the parking brake cylinder, a reduction in total parts is accomplished. Furthermore, the parking brake is actuated downwardly through the steering spindle and urges the brake pad into contact with the upper surface of a tire. By locating the parking brake cylinder in the steering spindle, minimal hydraulic plumbing is required, since hydraulic plumbing is frequently available at hydraulic motors driving each steerable wheel.

Accordingly, a primary object of the invention is to provide an automatic parking brake for use on a self-propelled vehicle carrying an elevatable boom or work platform, capable of holding relatively heavy self-propelled vehicles on relatively steep inclines.

A further object of the invention is to provide a combination automatic parking brake and steering spindle for use in a self-propelled vehicle wherein the steering spindle also forms the cylinder for the automatic parking brake.

Another object of the invention is to provide an automatic parking brake for a self-propelled vehicle having a relatively simple design with minimum number of components, in part because the parking brake cylinder also acts as a steering spindle.

Yet a further object of the invention is to provide an automatic parking brake for a self-propelled vehicle wherein the cylinder of the parking brake acts as a steering spindle and wherein an enlarged portion of the brake cylinder acts as a thrust bearing to transfer chassis weight of the vehicle to a mounting bracket connected to a steerable wheel.

Another object of the invention is to provide an automatic, heavy duty parking brake for a self-propelled vehicle wherein the brake holding force includes a friction component and a shear component because, when engaged, the brake temporarily deforms a solid rubber tire.

Other objects and advantages will become apparent from the following description and the drawings wherein:

DETAILED DESCRIPTION OF THE DRAWINGS

Figure 3:
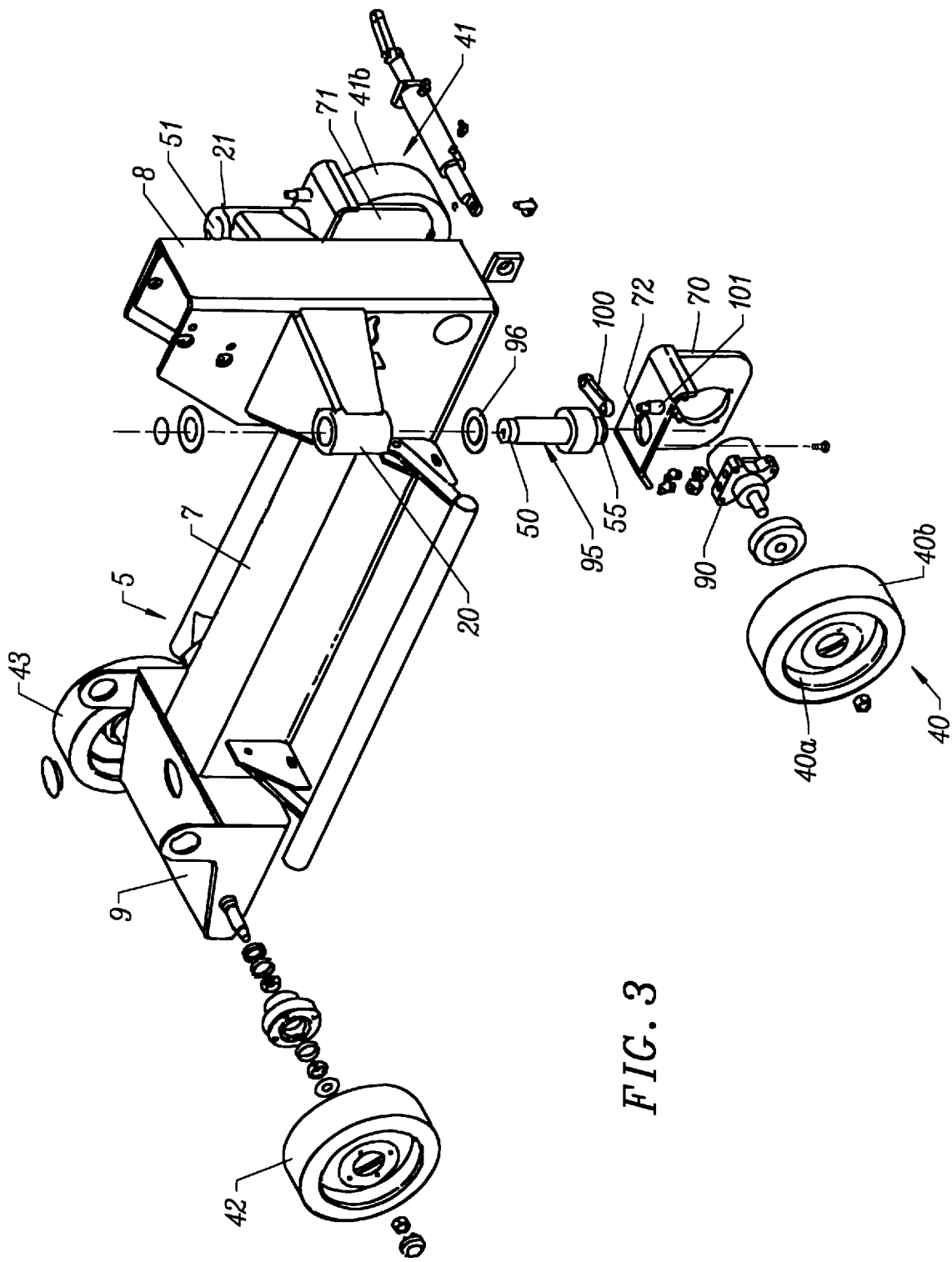
FIG. 3 is a perspective view, showing in exploded fashion, the main components of the invention.
Figure 6:
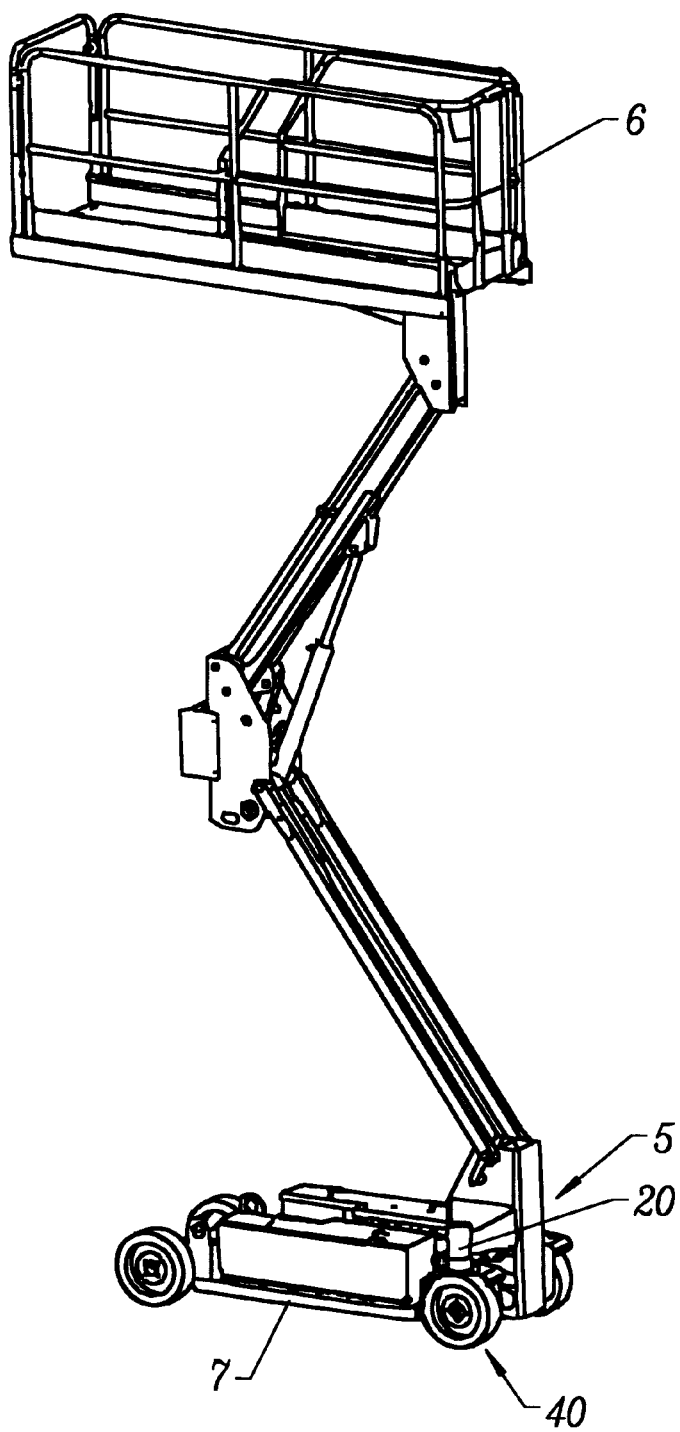
FIG. 6 is a perspective view of a self-propelled vehicle having an elevatable work platform in a raised position, wherein said vehicle utilizes the present invention.
Figure 7:
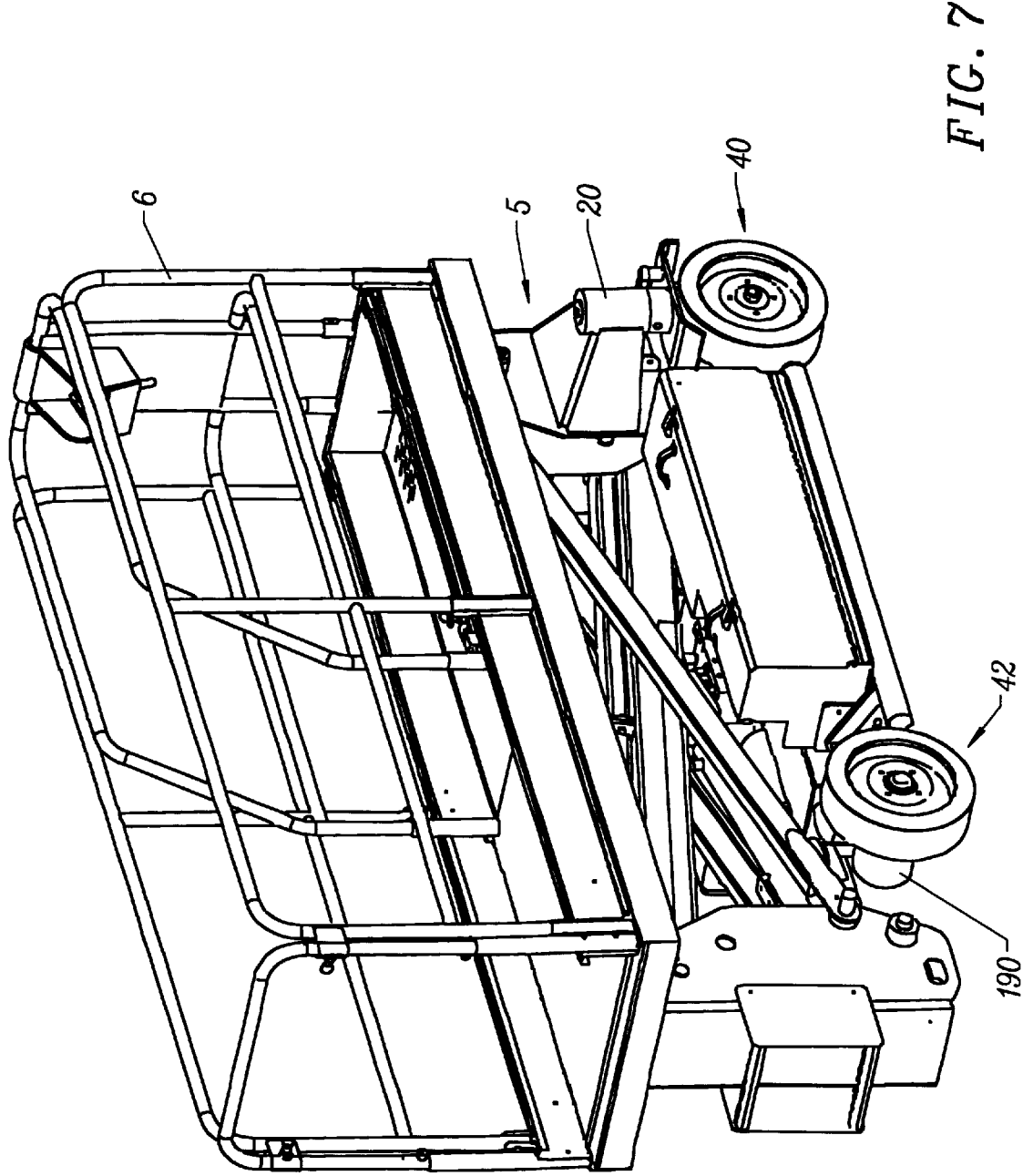
FIG. 7 is a perspective view of the vehicle of FIG. 6 with the platform lowered, wherein the propulsion system of the vehicle is electrical and the work platform is hydraulic.

Referring to FIGS. 3, 6 and 7, a self-propelled vehicle is shown generally as 5. FIG. 6 shows an elevatable work platform 6, which may be capable of elevating 40 feet or even more above ground and carrying a load of approximately 700 pounds. Vehicle 5 may alternately carry an elevatable boom (not shown) rather than a work platform. As noted above, the invention is readily adaptable for use with heavier vehicles and much heavier working loads. FIG. 3 shows the chassis 7 of vehicle 5 with the work platform not shown and associated drive and control mechanisms for the chassis also not shown. FIG. 3 shows the chassis 7 and components relating to the present invention shown in exploded form for clarity. Chassis 7 has a first end 8 and a second end 9. First end 8 carries two cylindrical and hollow steering spindle mounts 20 and 21, respectively, which are connected to first and second steerable wheels 40 and 41, respectively, as described below. Two non-steerable wheels 42 and 43 are carried by the second end 9 of chassis 7. As used herein and in the claims, the word "wheel" is used in its broadest sense. Wheels 40 and 41 include metallic rims 40*a* and 41*a* (rim 41*a* not visible in FIG. 3) and commercially available solid rubber tires 40*b* and 41*b*, respectively.

Two brake cylinders 50 and 51 are provided which extend through steering spindle mounts 20 and 21, respectively. Brake cylinders 50 and 51 are mounted on brackets 70 and 71, respectively. Brackets 70 and 71 are generally inverted L-shaped mounting brackets and are mounted between steerable wheels 40 and 41 and steering spindle mounts 20 and 21. Since the spindle mounts 20 and 21, brake cylinders 50 and 51 are identical, only spindle mount 20, cylinder 50, bracket 70 and wheel 40 will be described in detail.

Although FIG. 3 portrays a self-propelled vehicle having a total of four wheels and two of those four wheels being steerable, the invention also applies to self-propelled vehicles having three wheels with one or two steerable wheels. As a practical matter, the use of four wheels provides a vehicle more resistant to overturn. Similarly, although a four wheeled vehicle may be provided having the parking brake of the present invention mounted on only one of the steerable wheels, the drawings portray both steerable wheels as having the parking brake of the present invention.

A conventional hydraulic drive system (not shown) for operating the boom or work platform is preferably used also as the drive system to propel the vehicle. Alternately, the vehicle may be propelled by a separate drive system, which may be electric, diesel or gasoline powered. A commercially available hydraulic drive system is typically powered by an electric motor which powers a hydraulic pump which in turn delivers relatively high pressure hydraulic fluid to motors elevating the boom or work platform as well as to hydraulic drive motors for the steerable wheels. FIG. 3 shows a typical and conventional hydraulic drive or propulsion motor 90 carried by mounting bracket 70 for driving steerable wheel 40. The propulsion motors may in some cases be connected to the non-steerable wheels. For example, FIG. 7 shows an electric propulsion motor 190 connected to non-steerable wheel 42.

Figure 4:
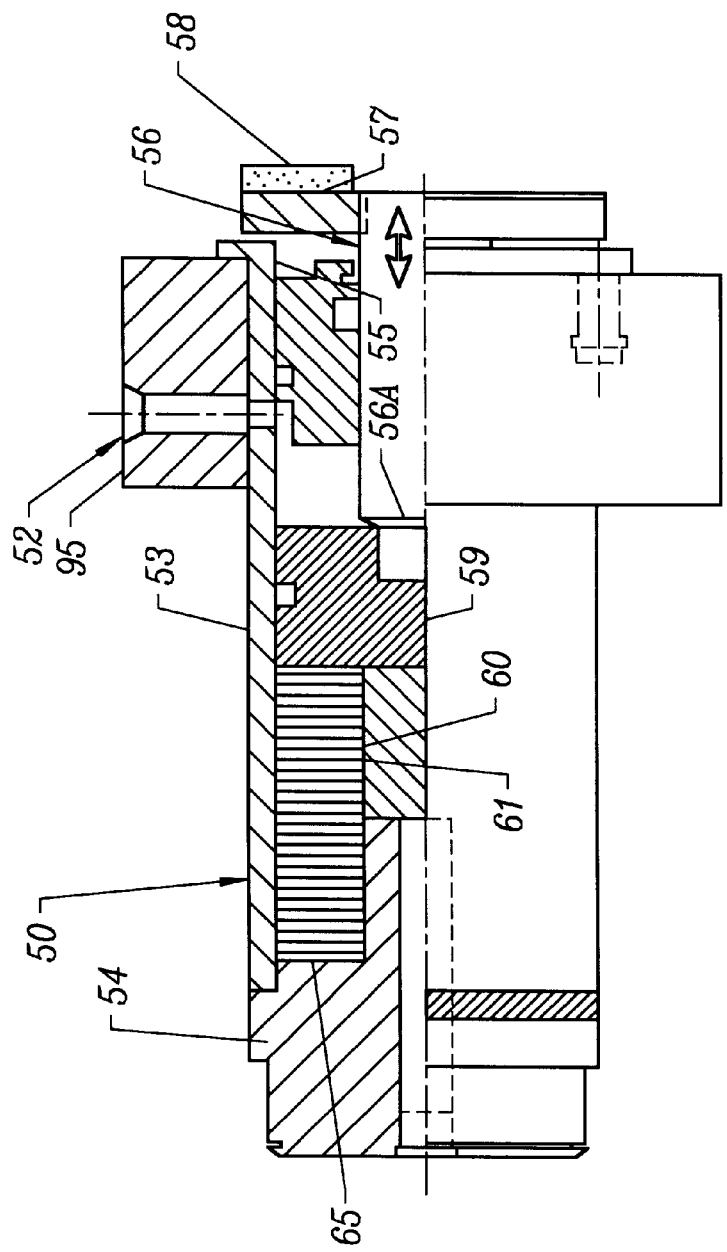
FIG. 4 is a sectional view of the brake cylinder according to the present invention.
Figure 5:
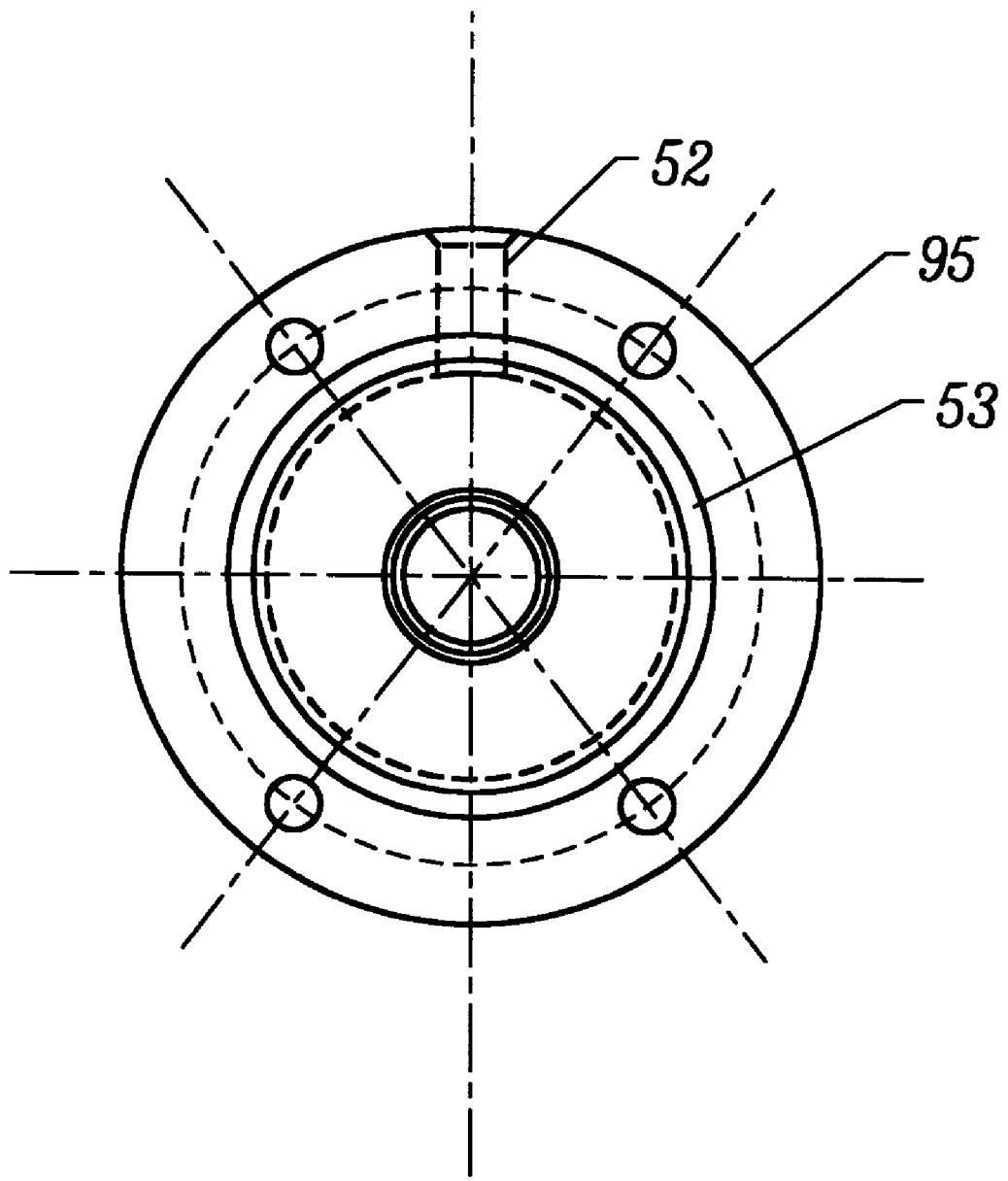
FIG. 5 is an elevational view of the cylinder shown in FIG. 4.

FIG. 4 shows in greater detail hydraulic cylinder 50 having a hydraulic inlet port 52 which may have its supply line routed to it directly from hydraulic drive motor 90, thereby minimizing the hydraulic plumbing required by using the parking brake of the present invention. Brake cylinder 50 includes a hollow cylindrical body portion 53. The upper end of cylinder 53 is closed by a solid cap 54. The lower end 55 of cylinder 53 carries a preferably chrome rod 56 which moves inwardly and outwardly relative to cylinder 50 and carries on its outward end a disc-shaped end piece 57 which in turn carries a brake pad 58. Alternately, rod 56 could be stainless steel or nitrited steel. Rod 56 carries a piston 59 at its inner end 56*a* which moves between first and second positions. In the first position of piston 59 (shown in FIG. 4), hydraulic fluid entering port 52 has been pressurized and has driven piston 59 against springs 61 to compress them, and brake pad 58 is retracted from engagement with a steerable wheel. In the second position of piston 59 (not shown), it is automatically driven toward a steerable wheel by springs 61 as the hydraulic fluid entering port 52 is depressurized and springs 61 expand.

Figure 1:
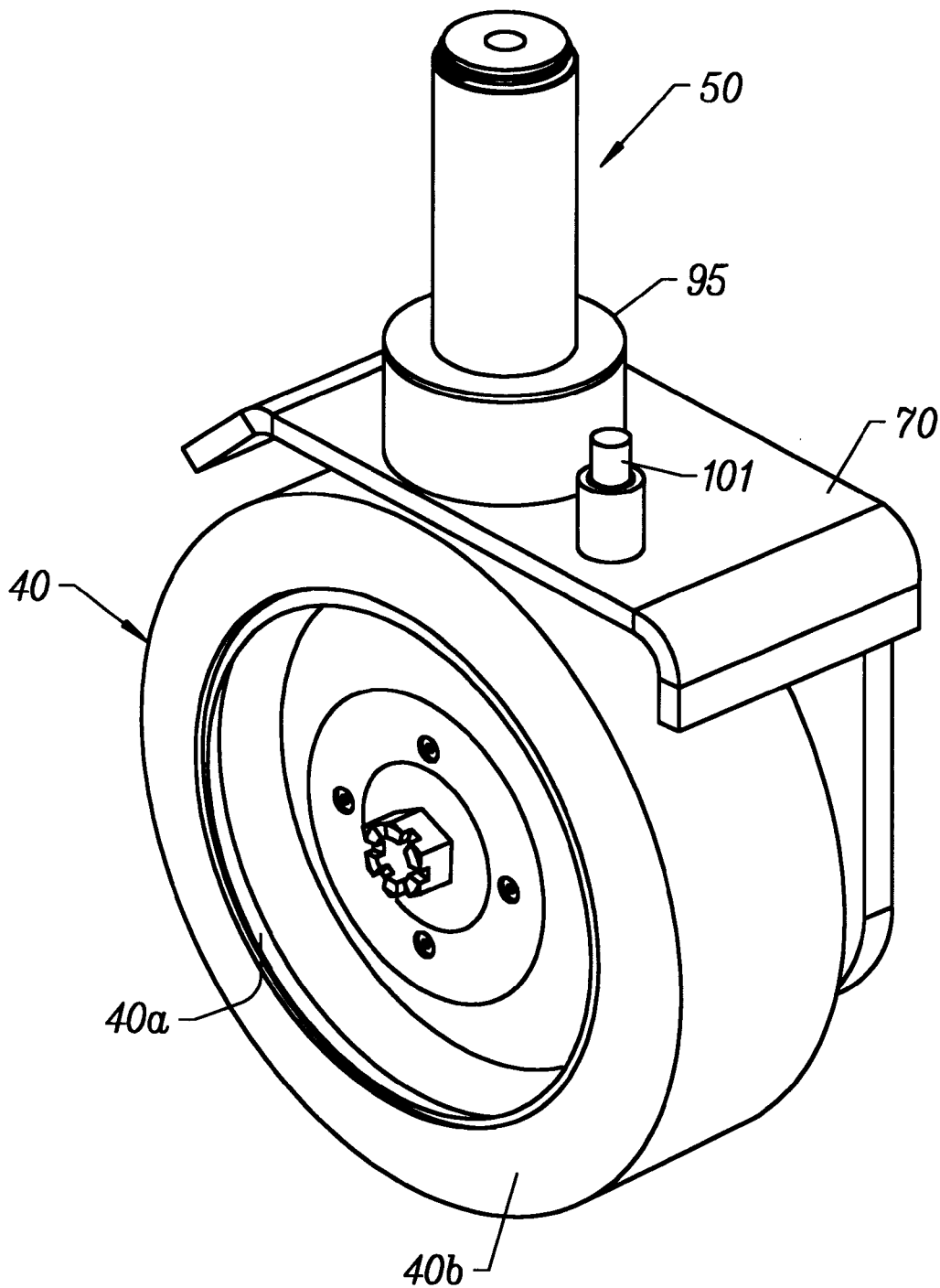
FIG. 1 is a perspective view showing the brake cylinder according to the present invention which also acts simultaneously as a steering spindle.
Figure 2:
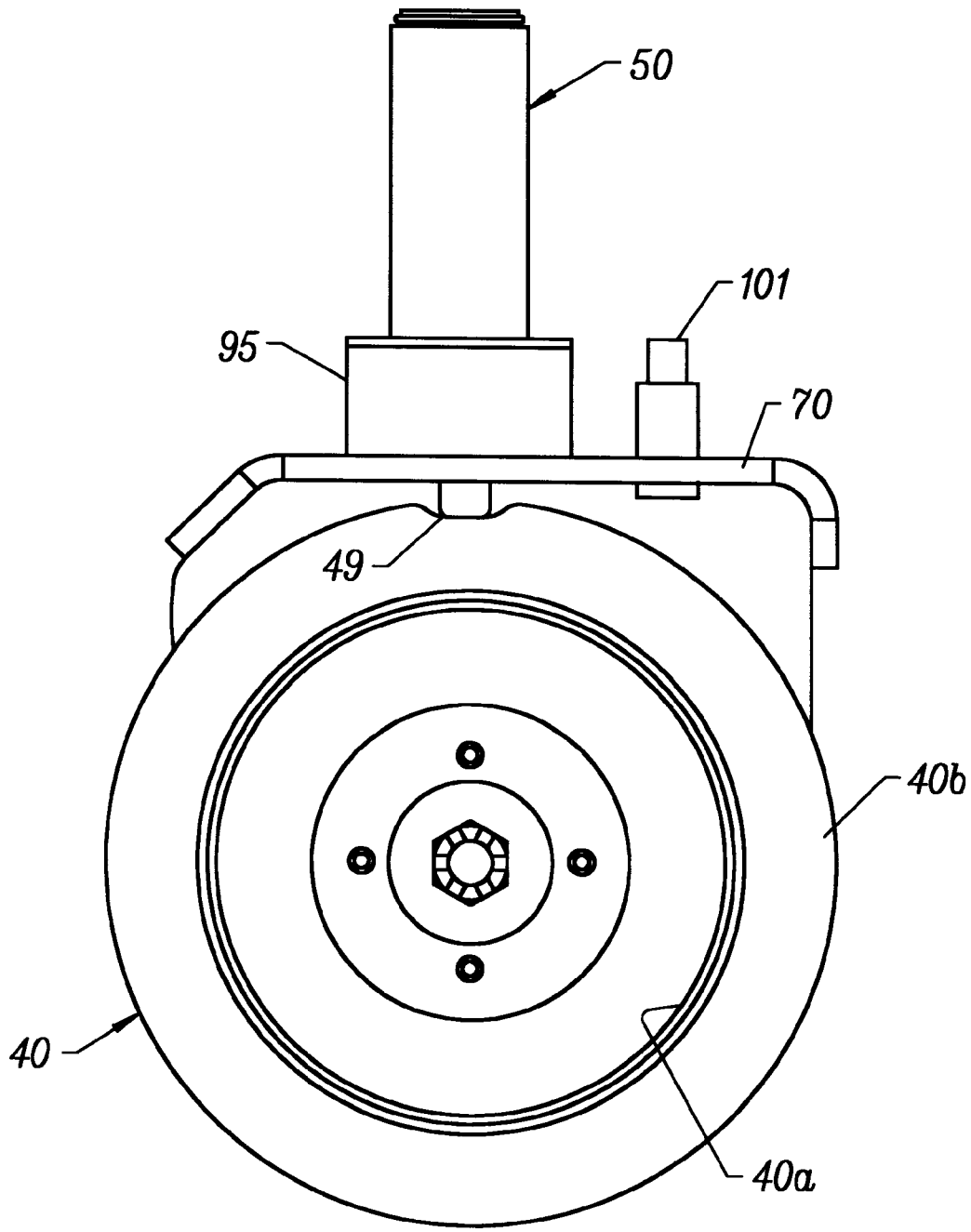
FIG. 2 is an elevational view of the apparatus shown in FIG. 1.

An annular recess 55 is formed in solid cap 54 which carries a brake actuator means 60. Brake actuator means 60 includes a plurality of wave springs 61 which bear against piston 59 which in turn bears against rear surface 56*a* of chrome piston rod 55 and tends to drive the end plate 57 and the brake pad 58 it carries to the right in FIG. 4 and downwardly against steerable wheel 40. When hydraulic pressure enters port 52 as the hydraulic propulsion system for the vehicle is actuated, hydraulic fluid under pressure enters the interior hollow chamber of cylinder 53. Hydraulic pressure drives piston 59 to the left in FIG. 4 and compresses wave springs 61 and simultaneously allows the chrome piston rod 56 to retract to its position shown in FIG. 4. When the hydraulic propulsion system for the self-propelled vehicle is shut off, wave springs 61 expand and drive piston rod 56 toward steerable wheel 40 and engages the parking brake of the present invention. Although FIG. 4 shows a plurality of wave springs which in the preferred embodiment is a series of Belville springs, it is understood that the brake actuator means can also comprise a single coil spring or even other known springs. The parking brake actually temporarily deforms the surface of the tire and forms a depression 49 (FIG. 2). The holding force created between the parking brake and tire includes a first component which is generated by friction between the tire surface and brake pad. The second component is the shear force between the deformed rubber and the brake pad which must be overcome for the vehicle to move when the parking brake is engaged.

As shown best in FIG. 3, cylinder 53 extends upwardly through spindle mount 20 and simultaneously acts as a steering spindle for the vehicle 5 and simultaneously acts as the brake cylinder for the automatic and hydraulic parking brake.

The lower end 55 of cylinder 53 extends downwardly into passageway 72 formed in the top, horizontal section of inverted L-shaped bracket 70.

Surrounding cylinder 53 near its lower end 55 is an annular thrust bearing means 95 which serves to transfer a portion of the weight of chassis 7 through spindle mount 20, mounting bracket 70 to steerable wheel 40. A disc-shaped thrust washer 96 is carried between thrust bearing means 95 and the lower surface 29 of hollow steering spindle mount 20.

A steering arm 100 connects to steering pin 101 carried by mounting bracket 70 and connects to conventional steering linkage (not shown).

In operation, the parking brake according to the present invention is engaged automatically when the propulsion system for the vehicle 5 is shut off. The wave springs within the parking brake cylinders 50 and 51 drive the piston rod 56 which carries the brake pad and causes the brake pad to be forced against the top of the solid rubber tire 40*b* of steerable wheel 40, and deforms tire 40*b* by forming a depression 49 in its surface. When the hydraulic propulsion system for the vehicle (or electrical, diesel or gasoline powered propulsion system) is activated and the hydraulic fluid is pressurized, the pressurized fluid compresses the spring or springs which form the brake actuator means, and overcomes and compresses those springs, allowing the piston rod 56 to withdraw into the cylinder and release the parking brake from the steerable wheel 40.

It is to be understood that variations may be made in the design shown without departing from the spirit of the invention.

What is claimed is:

1. A combination automatic parking brake and steering spindle for use in conjunction with a steerable wheel in a self-propelled vehicle, a propulsion system for said vehicle, at least one steerable wheel, a hollow steering spindle mount carried above said steerable wheel, wherein said parking brake is automatically activated whenever said propulsion system is shut off, and said parking brake is automatically released whenever said propulsion system is turned on, comprising:

a brake pad carried above said steerable wheel, brake cylinder means above said steerable wheel, said brake cylinder means carrying said brake pad and extending through said hollow steering spindle mount, said brake cylinder means forming a hollow, cylindrical and generally vertically oriented steering spindle, brake actuator means connected to said brake pad, said brake actuator means including a spring urging said brake pad against said steerable wheel, and automatic hydraulic brake release means carried by said brake cylinder means, said automatic hydraulic brake release means releasing said brake pad from said steerable wheel whenever said propulsion system is activated by applying sufficient hydraulic pressure to apply sufficient force to overcome and to release said brake actuator means.

2. The apparatus of claim 1 further comprising a generally inverted L-shaped mounting bracket between said steerable wheel and said steering spindle mount, said brake cylinder means extending through said mounting bracket, and thrust bearing means connected to said brake cylinder means for transferring chassis weight from said steering spindle mount to said mounting bracket.

3. The apparatus of claim 1 wherein a single hydraulic drive system is utilized to drive said boom or work platform and to propel said vehicle.

4. The apparatus of claim 1 wherein said steerable wheel includes a solid rubber tire which temporarily deforms when said brake pad is urged against it, and wherein the holding force includes a frictional component between said brake pad and tire and a shear component between said brake pad and said temporarily deformed portion of said tire.

5. A combination automatic parking brake and steering spindle assembly for use in conjunction with a steerable wheel in a self-propelled vehicle having an elevatable boom or work platform, comprising a chassis having at least one generally vertically oriented cylindrical, hollow steering spindle mount formed therein, a hydraulic drive means for propelling said vehicle and for operating said elevatable boom or work platform, at least one steerable wheel, a brake pad carried above said steerable wheel, brake cylinder means above said steerable wheel carrying said brake pad and extending through said hollow steering spindle mount, said brake cylinder means forming a cylindrical hollow steering spindle, brake actuator means connected to said brake pad, said brake actuator means including a spring urging said brake pad against said steerable wheel, and automatic hydraulic brake release means carried by said brake cylinder means, said automatic hydraulic brake release means releasing said brake pad from said steerable wheel whenever said hydraulic drive means for propelling said vehicle is activated by applying sufficient hydraulic pressure to apply sufficient force to overcome and to release said brake actuator means.

6. The apparatus of claim 5 further comprising:

a generally inverted L-shaped mounting bracket between said steerable wheel and said steering spindle mount, said brake cylinder means extending through said mounting bracket, and thrust bearing means connected to said brake cylinder means for transferring chassis weight from said steering spindle mount to said mounting bracket.

7. A combination automatic parking brake and steering spindle assembly for use in conjunction with two steerable wheels in a self-propelled vehicle having an elevatable boom or work platform, comprising a chassis having first and second ends, and two generally vertically oriented cylindrical, hollow steering spindle mounts formed in said first end, two steerable wheels at said first end, and two non-steerable wheels at said second end, a single hydraulic drive system for propelling said vehicle and for operating said elevatable boom or work platform, a brake pad carried above each of said steerable wheels, two brake cylinder means, each above one of said steerable wheels and each carrying one of said brake pads and extending through one of said hollow steering spindle mounts, each of said brake cylinder means forming a hollow, cylindrical steering spindle, brake actuator means connected to each of said brake pads, urging said brake pads against said steerable wheels, and automatic hydraulic brake release means carried by each of said brake cylinder means, said automatic hydraulic brake release means each releasing one of said brake pads from a steerable wheel whenever said single hydraulic drive system is activated by applying sufficient hydraulic pressure to apply sufficient force to overcome and to release said brake actuator means.

8. The apparatus of claim 7 further comprising:

two generally inverted L-shaped mounting brackets, mounted respectively between each steerable wheel and one of said two steering spindle mounts, each of said brake cylinder means extending through one of said mounting brackets, and thrust bearing means connected to each of said two brake cylinder means for transferring chassis weight from said steering spindle mounts to said mounting brackets.

* * * * *